May 28, 1946.  F. M. MORGAN ET AL  2,400,943
PHOTOGRAPHIC TANK REEL
Original Filed Oct. 5, 1939   2 Sheets-Sheet 1

INVENTORS
FRANK M. MORGAN
AND STANLEY WALLACE
BY
Louis Sheldon
ATTORNEY

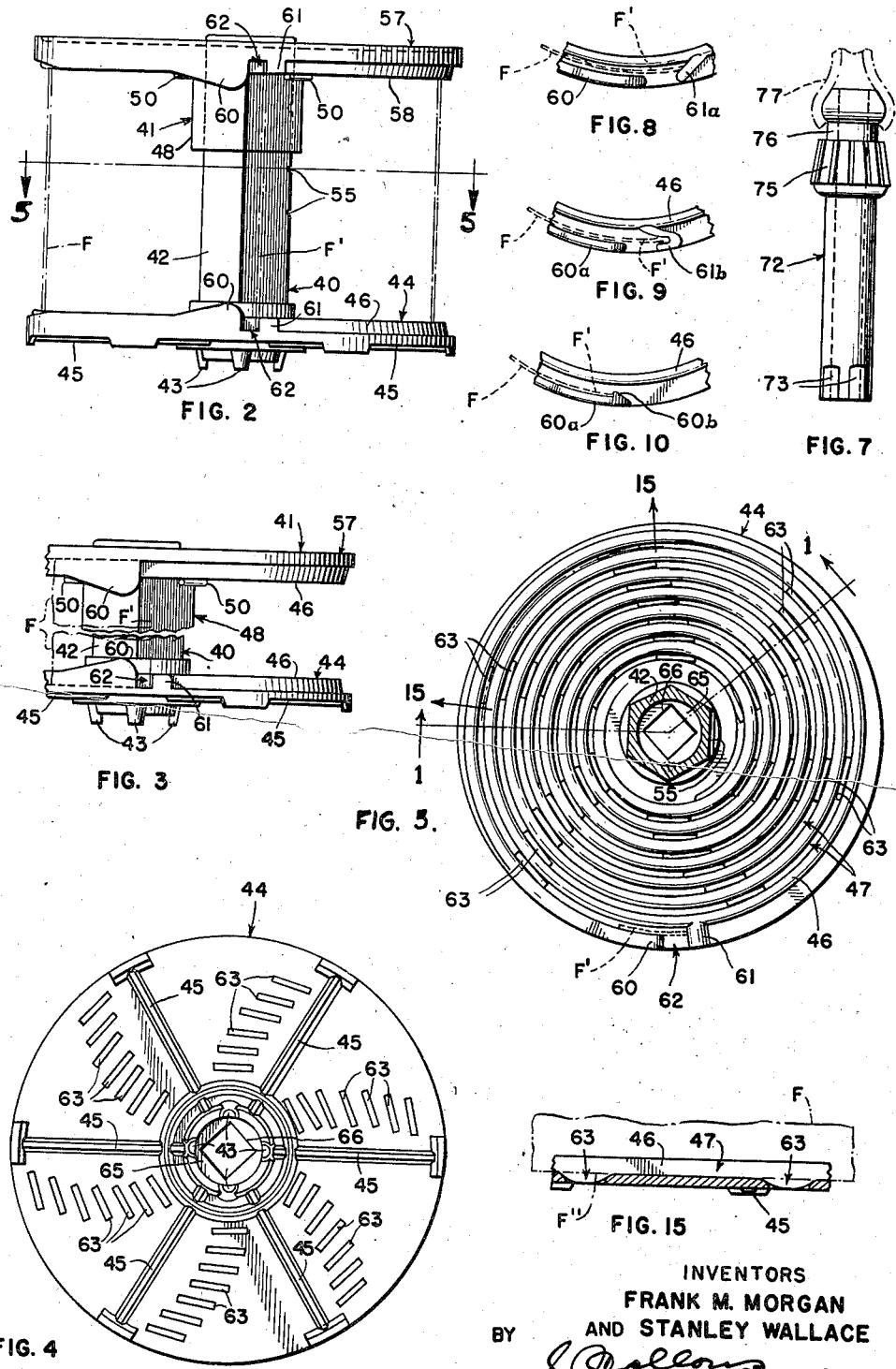

Patented May 28, 1946

2,400,943

UNITED STATES PATENT OFFICE 2,400,943

PHOTOGRAPHIC TANK REEL

Frank M. Morgan, Glen Ellyn, and Stanley Wallace, Chicago, Ill., assignors to Sears, Roebuck and Co., Chicago, Ill., a corporation of New York Original application October 5, 1939, Serial No. 297,976, now Patent No. 2,344,998, dated March 28, 1944. Divided and this application March 25, 1944, Serial No. 528,018

5 Claims. (Cl. 242—77)

This is a division of our application, Serial No. 297,976, filed October 5, 1939, entitled "Photographic tank," now U. S. Patent No. 2,344,998, issued March 28, 1944.

Our invention relates to photographic tanks for developing and other operations in the processing of roll film and is especially designed for use by amateurs.

A principal object of the present invention is to provide a photographic tank reel which affords rapid and facile adjustability for accommodating various film widths, which will efficiently and securely hold various types of film reels during diverse processing operations, and which may be manufactured economically of inexpensive material.

Various other objects and advantages will suggest themselves as the description proceeds.

Referring now to the drawings forming a part of this specification and illustrating a preferred embodiment of our invention:

Fig. 2 is a side elevation of our adjustable reel removed from its tank container and having the reel flanges spaced apart to accommodate a particular width of film;

Fig. 3 is a fragmentary side elevational view of the apparatus illustrated in Fig. 2 with mid-portions broken away;

Fig. 4 is an inverted plan sectional view of the integral flange having certain features of our invention incorporated therein;

Fig. 5 is a plan sectional view taken approximately on line 5—5 of Fig. 2;

Fig. 6 is a detail sectional view taken approximately on line 6—6 of Fig. 1;

Fig. 7 is a detail view of a modified form of reel agitating key;

Figs. 8 to 10 are fragmentary detail plan views of alternative forms of film latching structures applicable to various types of reels;

Figure 11:
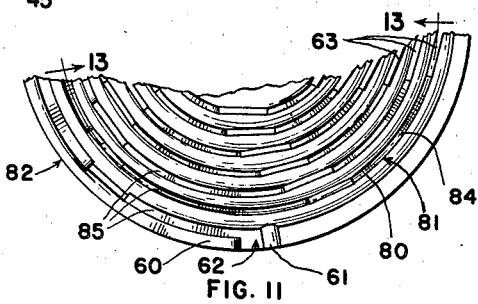
Fig. 11 is a fragmentary plan view of the reel apparatus viewed in the same manner as Fig. 5.
Figure 13:
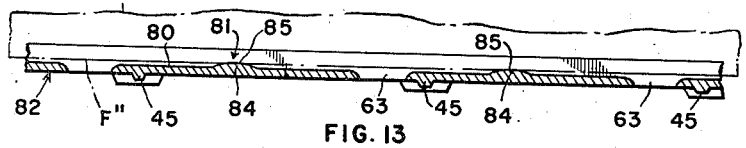
Figure 14:
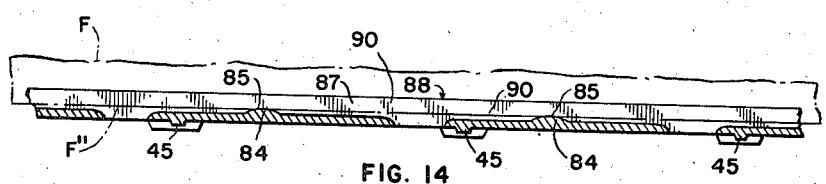
Figure 12:
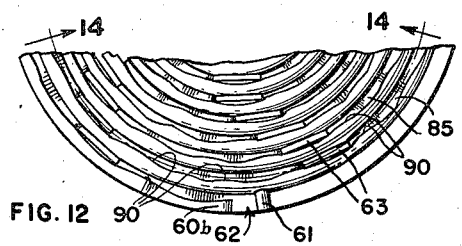
Fig. 12 is a fragmentary view featuring a modified form of structure from that illustrated in Fig. 11.

Figs. 13 and 14 are developed sectional views on lines 13—13 and 14—14 of Figs. 11 and 12, respectively; and Fig. 15 is an enlarged detail sectional view developed along the line 15—15 of Fig. 5.

The numeral 10 indicates generally a tank of a size suitable for the processing of roll film and having a cylindrical side wall 11 and an elevated bottom 12 with a depressed central portion 13 therein. The side wall 11 terminates at the top in a U-shaped portion 15 comprising flanges 15a and 15b separated by a channel 16.

We provide a closure means or cover 18 comprising a circular top wall 19 having a depressed cup-like portion 20 in the central portion thereof, the latter having a cylindrical downwardly extending flange 21. The cover has a cylindrical side wall 23 which extends within the flange 15a of the tank wall 11. The cover is also provided with a circular flange 25 which extends within the channel 16, and an outer rim portion 26 which seats outside of the flange 15b of the tank. The flange 26 is connected to the wall portion 23 of the cover by means of an annular web 27, a slot 28 being provided in the latter in registry with the channel 16 to serve as a pouring spout. As shown in Fig. 2, sufficient clearance is provided between the various elements of the closure adjacent the spout 28 to permit the passage of fluid.

The arrangement of the closure elements is such that the passage of light into the interior of the tank is effectively prevented.

Figure 1:
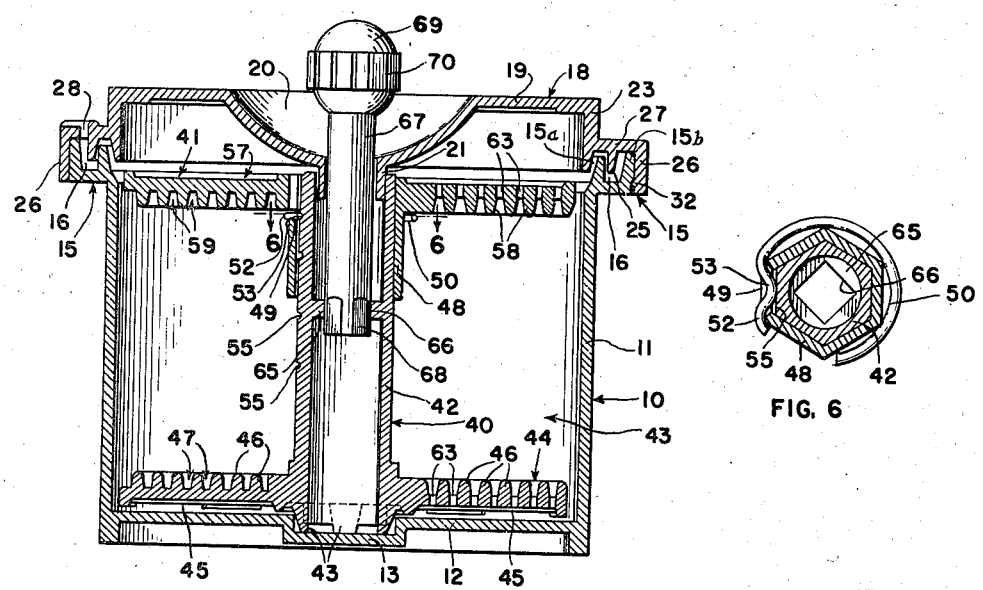
Fig. 1 is a transverse sectional view through a photographic tank illustrating our improved adjustable reel applied thereto.

The film retaining reel forming a part of our invention includes a pair of cooperating elements 40 and 41. The part 40 comprises a hollow spindle 42 which, as seen best in Figs. 1 and 5, is of an irregular hexagonal shape on the outside and has integral feet 43 extending into the well formed by the depressed portion 13 of the tank, the feet 43 being spaced apart and formed on a periphery permitting passage of fluid from the interior of the spindle 42 into the tank space 43. Integral with the spindle 42 is a disc 44 which may be provided with reinforcing ribs 45 and has a spiral flange 46 formed on the upper portion thereof, thus forming a spiral groove 47 within which a film F may be seated.

The upper reel part 41 comprises a sleeve portion 48 which, as shown best in Figs. 1 and 2, is of an eccentric hexagonal shape conforming to that of the spindle 42 and adapted to slide thereover. It will be understood, of course, that the spindle 42 and sleeve 48 may be of any eccentric shape so that they may be interfitted in only one relation. The purpose of this will appear shortly.

The sleeve 48 is slotted at 49 to seat a spring clip 50 formed of wire or the like, the seated portion 53 of the clip 50 extending inward and resiliently engaging selectively in any one of a series of recesses or grooves 55 which are provided at spaced intervals along the spindle 42. The grooves 55 are provided at definite intervals corresponding to the widths of standard roll film, so that the part 41 may be adjusted to any one of several fixed positions along the spindle 42, and the reel may thus be adjusted to accommodate a desired size of film.

Integral with the sleeve 43 is a disc 57 which is provided with a spiral rib 58 and associated groove 59 corresponding to the rib 46 and groove 47, respectively, of the lower disc.

As seen in Figs. 3, 5, 11 and 12, each of the discs is provided with an ear 60 adjacent which is a lug 61 defining therewith a peripheral gate or opening 62 through which film may be fed into or removed from the spiral groove 47. It will now be seen that the two parts 40 and 41 should be fitted together in only a certain relation, in order that the gates 62 may register so that the film may be conveniently inserted and removed through both gates simultaneously. The lug 61 serves as a stop or abutment to check escape of the outer end F' of the film F. The film-end engaging face of each lug may be at substantially a right angle to the end of the film as shown in Fig. 5. If desired, the lug may be omitted from one of the discs, as shown in Fig. 3, the other lug being relied upon to check the outer end F' of the film.

Instead of arranging the lug at substantially a right angle to the outer end F' of the film F, the lug may be at an acute angle as shown at 61a in Fig. 8, or in the form of a hook as at 61b independently of the rib 46 as shown in Fig. 9. Or, if desired, the lug could be omitted from each disc and the projection 60a formed with an offset 60b against which the outer end of the film is adapted to abut, as shown in Fig. 10.

The discs 44 and 57 are provided with slots 63 to promote rapid flow of the liquid to the film.

The spindle 42 is provided with a neck 65 having a square or other non-circular opening 66 therein for the purpose of receiving an agitating rod 67 having a correspondingly shaped end portion 68 adapted to engage in the opening 66. In the form shown in Fig. 1, the stirring rod may be solid, having an enlarged handle portion 69 which may be knurled as at 70.

In another form, shown in Fig. 7, the agitator rod 72 is hollow and shaped at the end portion 73 to engage in the neck 65 and may have a knurled portion 75. Extending beyond the knurled portion is a nipple 76 adapted to engage the end of a hose 77. This type of agitator may be employed for washing a film in the tank after it has been processed, the hose 77 being connected to a tap or the like. Also, a thermometer (not shown) may be inserted into the hollow rod when desired to check the temperature of the solution in the tank.

A modified reel disc construction is shown in Figs. 11 to 14, wherein the bottom surface 80 of the spiral groove 81 of each reel disc 82 or of only the lower disc is circumferentially crowned as at 84 so that only the peaks 85 of said surfaces engage the upper and lower edges F'' (or the lower edge) of the film F, thereby substituting a series of substantially point contacts for the line contact which obtains when said surfaces are flat, so as to minimize friction. Since in practice sufficient clearance between the discs is afforded to obviate binding of the edges of the film, it follows that because of gravity the brunt of the engagement of the film will be at the lower disc, so that if desired only the film-edge engaging groove bottom surfaces on the lower disc need be crowned.

With a view to still further minimizing engagement of the film by the reel, each or merely the lower disc may be formed with the inner face 87 of the rib 88, undulating circumferentially as shown in Figs. 12 and 14, providing lateral peaks or crests 90 affording a series of substantially point contacts with the outer side edge portions of the film F. These peaks may be located in register with or in any other desired relation to the floor peaks 85.

It is believed that the operation of the device described above will be readily apparent. The two parts 40 and 41 of the reel having been fitted together and adjusted to receive film of the desired size, the film will be fed into the reel through the openings 62 and into the registered spiral grooves of the reel discs, the reel then seated in the tank and the latter closed by securing the cover to the body. This operation, of course, will take place in the darkroom. After the cover is applied, the device may be taken into the daylight, if desired, and the developing fluid will be poured into the tank through the cup-shaped portion 20 and withdrawn by pouring it out of the spout 28. In the course of the development, the rod 67 or 72 will be arranged as shown in Fig. 1 and the reel rotated thereby to impart the desired amount of agitation. At the completion of the various steps of the processing, the cover may be removed and the film washed in any desired manner with or without the cover in place. A hose from the tap may be connected to the hollow stirring rod of Fig. 7 with the cover in place, for the washing operation.

All parts of the apparatus may be molded out of Bakelite or other suitable plastic which is immune to the reagents of photographic processing with the exception of the resilient clip 50, and this element also may be of such metal or other substance as is inert to such materials. It thus will be seen that we have provided a device which is simple, convenient, readily adjustable, and which has many advantages over devices of this type previously known.

Various modifications and changes coming within the spirit of our invention may suggest themselves to those skilled in the art, and, hence, we do not wish to be limited to the specific forms shown or uses mentioned.

We claim:

1. An axially adjustable reel comprising a pair of cooperating plates adapted to receive therebetween a strip of film, a spindle attached to one of said plates, a sleeve attached to the other plate and telescopically receiving said spindle, said spindle having a plurality of recesses spaced longitudinally thereof, said sleeve being apertured transverse to the axis thereof, and a resilient member clasping said sleeve and having a portion extending inward through the transverse aperture in said sleeve and selectively engageable in any one of said recesses.

2. An adjustable reel for holding roll film in tank developers, comprising a pair of opposite circular plate members having their corresponding faces helically grooved, one of said members having a hollow perpendicular polyhedral spindle and the other of said members having a polyhedral bushing adapted to slide over said spindle, said spindle having a plurality of spaced transverse notches on one of its surfaces and said bushing having an opening through which a spring element protrudes for engaging the notches of said spindle in springable detenting cooperation whereby adjustment is afforded by sliding said bushing into various notch-engaging positions of said spindle.

3. A roll film supporting reel for developing tanks, comprising a pair of disk elements formed with helically grooved corresponding face surfaces in symmetrically opposite patterns, a hollow spindle integral with one of said disk elements of polygonal cross-section and provided with spaced shallow notchings on one of its polygonal surfaces, a bushing integral with the other one of said disk elements having an internal opening corresponding to the polygonal cross-section for slidable movement thereupon, and a resilient detent member comprising a spring ringlet of round wire formed with an inwardly directed sinuosity for extending through an opening in said bushing to exert a retentive pressure upon any of said notchings for thereby maintaining predetermined spaced relationship between said disk elements.

4. The combination set forth in claim 3, in which said helical grooves are of inverse scalloped contour so as to afford point contact only with the edges of roll film positioned between said disk elements.

5. A roll film supporting reel for use in developing tanks comprising a pair of disk elements formed with symmetrically opposite helical ridges with the intervening spaces between said ridges inversely scalloped so as to afford point contact only with roll film supported therein, a hollow spindle integral with one of said disk elements provided with a plurality of predetermined surface notchings, a bushing integral with the other one of said disk elements having an opening therein, and a resilient detent member comprising a spring ringlet encircling said bushing and having a sinuosity for extending through said opening to engage one or another of the notchings of said spindle for thereby adjusting the spaced relationship between said disk elements to accommodate various widths of roll film.

FRANK M. MORGAN.
STANLEY WALLACE.